United States Patent
Baria et al.

(10) Patent No.: US 10,400,693 B2
(45) Date of Patent: Sep. 3, 2019

(54) VEHICLE TURBOCHARGER SYSTEMS AND METHODS WITH IMPROVED AFTERTREATMENT ACTIVATION

(71) Applicant: GM GLOBAL TECHNOLOGY OPERATIONS LLC, Detroit, MI (US)

(72) Inventors: Riccardo Baria, Bruino (IT); Alberto Racca, Cavallermaggiore (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 15/643,775

(22) Filed: Jul. 7, 2017

(65) Prior Publication Data
US 2019/0010881 A1  Jan. 10, 2019

(51) Int. Cl.
*F02D 41/02* (2006.01)
*F02B 39/10* (2006.01)
*F02B 37/04* (2006.01)
*F02B 37/24* (2006.01)
*F02B 37/16* (2006.01)
*F02D 41/00* (2006.01)
*F02D 41/14* (2006.01)

(52) U.S. Cl.
CPC ............ *F02D 41/024* (2013.01); *F02B 37/04* (2013.01); *F02B 37/16* (2013.01); *F02B 37/24* (2013.01); *F02B 39/10* (2013.01); *F02D 41/0007* (2013.01); *F02D 41/1446* (2013.01); *F02D 2200/021* (2013.01); *F02D 2200/0406* (2013.01); *F02D 2200/0414* (2013.01); *F02D 2200/1002* (2013.01); *F02D 2250/18* (2013.01)

(58) Field of Classification Search
CPC .............. F02D 41/024; F02D 41/0007; F02D 2200/021; F02D 2200/0406; F02D 2200/1002; F02B 37/16; F02B 37/24; F02B 39/10
USPC ............................ 60/611, 612, 608; 123/562
See application file for complete search history.

(56) References Cited

U.S. PATENT DOCUMENTS

| | | | | |
|---|---|---|---|---|
| 4,761,608 A | * | 8/1988 | Franklin | ................ G01D 18/00 123/349 |
| 6,705,084 B2 | * | 3/2004 | Allen | ...................... F02B 39/10 60/608 |

(Continued)

FOREIGN PATENT DOCUMENTS

| | | | | |
|---|---|---|---|---|
| CN | 204314073 U | * | 5/2015 | |
| WO | WO-2016058739 A1 | * | 4/2016 | .............. F02B 39/10 |
| WO | WO-2016121092 A1 | * | 8/2016 | .............. F02B 39/10 |

*Primary Examiner* — Thai Ba Trieu
(74) *Attorney, Agent, or Firm* — Lorenz & Kopf LLP

(57) ABSTRACT

A turbocharger system for an engine of a vehicle includes a variable geometry turbine configured to receive exhaust gas from the engine. The variable geometry turbine includes adjustable vanes and a vane actuator to adjust the adjustable vanes between at least an open position and a closed position. The turbocharger further includes an intake duct configured to receive intake air; a first compressor rotationally coupled to the variable geometry turbine and fluidly coupled to the intake duct to compress at least a first portion of the intake air; an electric compressor fluidly coupled to the intake duct to selectively compress at least a second portion of the intake air; and a manifold conduit fluidly coupled to the first compressor and the electric compressor and configured to receive and direct the first and second portions of the intake air to a manifold of the engine.

14 Claims, 5 Drawing Sheets

(56) References Cited

U.S. PATENT DOCUMENTS

| | | | | |
|---|---|---|---|---|
| 7,188,512 | B1* | 3/2007 | Wills | F02D 41/1467 73/114.69 |
| 7,540,148 | B2* | 6/2009 | Wild | F02B 39/10 60/608 |
| 7,644,586 | B2* | 1/2010 | Yamagata | F02D 41/0007 60/612 |
| 2016/0061102 | A1* | 3/2016 | Sugiyama | F02B 39/10 60/611 |
| 2016/0061104 | A1* | 3/2016 | Hirayama | F02B 39/10 60/602 |
| 2017/0016389 | A1* | 1/2017 | Xiao | F02B 39/10 |
| 2017/0030259 | A1* | 2/2017 | Tabata | F02B 39/10 |
| 2017/0044971 | A1* | 2/2017 | Racca | F02B 39/10 |
| 2017/0138365 | A1* | 5/2017 | Oshita | F02B 37/04 |
| 2017/0198631 | A1* | 7/2017 | Zhang | F02B 39/10 |
| 2017/0218834 | A1* | 8/2017 | Kemmerling | F02B 39/10 |
| 2017/0328271 | A1* | 11/2017 | Yamashita | F02B 39/10 |
| 2017/0328272 | A1* | 11/2017 | Yamashita | F02B 39/10 |
| 2018/0163675 | A1* | 6/2018 | Oshita | F02D 41/0007 |

* cited by examiner

VEHICLE TURBOCHARGER SYSTEMS AND METHODS WITH IMPROVED AFTERTREATMENT ACTIVATION

TECHNICAL FIELD

The present disclosure generally relates to an internal combustion engine, typically an internal combustion engine of a motor vehicle, and more particularly relates to internal combustion engines with turbochargers and aftertreatment systems.

BACKGROUND

Internal combustion engines may burn a mixture of air and fuel within one or more combustion chambers and produce exhaust gas. Some automotive systems may include an aftertreatment system to provide reduced emissions. However, some aftertreatment systems may require certain temperatures to operate optimally.

Accordingly, it is desirable to provide improved automotive systems, including systems that improve operation of the aftertreatment systems. Furthermore, other desirable features and characteristics of the present invention will become apparent from the subsequent detailed description and the appended claims, taken in conjunction with the accompanying drawings and the foregoing technical field and background.

SUMMARY

In one embodiment, a turbocharger system for an engine of a vehicle includes a variable geometry turbine configured to receive exhaust gas from the engine. The variable geometry turbine includes adjustable vanes and a vane actuator to adjust the adjustable vanes between at least an open position and a closed position. The turbocharger further includes an intake duct configured to receive intake air; a first compressor rotationally coupled to the variable geometry turbine and fluidly coupled to the intake duct to compress at least a first portion of the intake air; an electric compressor fluidly coupled to the intake duct to selectively compress at least a second portion of the intake air; and a manifold conduit fluidly coupled to the first compressor and the electric compressor and configured to receive and direct the first and second portions of the intake air to a manifold of the engine.

In another embodiment, the turbocharger system further includes an electronic control unit configured to control operation of at least the vane actuator and the electric compressor.

In a further embodiment, the electronic control unit includes a turbocharger calibration module that, upon activation of the electric compressor, generates a command signal for the vane actuator to place the adjustable vanes into an open position.

In another embodiment, the turbocharger calibration module generates the command signal for the vane actuator based on sensor signals representing engine manifold pressure and temperature.

In a further embodiment, the turbocharger calibration module further generates the command signal for the vane actuator based on an instantaneous torque command signal.

In another embodiment, the engine includes an aftertreatment system with a temperature activation threshold, and the turbocharger calibration module generates the command signal for the vane actuator when exhaust gas from the engine has a temperature less than the aftertreatment activation threshold.

In a further embodiment, the turbocharger system further includes a bypass valve fluidly coupled to selectively provide at least one of the first portion of intake air to the first compressor and the second portion of the intake air to the electric compressor.

In another embodiment, the first compressor is upstream of the electric compressor such that the second portion of intake air comprises the first portion of intake air.

In a further embodiment, the electric compressor is upstream of the first compressor such that the first portion of intake air is formed by the second portion of intake air.

In another embodiment, an automotive system is provided. The automotive system includes an internal combustion engine configured to burn intake air and to produce exhaust gas and a turbocharger coupled to receive the intake air from an intake duct and direct the intake air to the internal combustion engine. The turbocharger includes a variable geometry turbine fluidly coupled to receive the exhaust gas from the engine. The variable geometry turbine includes adjustable vanes and a vane actuator to move the adjustable vanes between at least an open position and a closed position. The turbocharger further includes a first compressor rotationally coupled to the variable geometry turbine and fluidly coupled to the intake duct to compress at least a first portion of the intake air; an electric compressor fluidly coupled to the intake duct to selectively compress at least a second portion of the intake air; and a manifold conduit fluidly coupled to the first compressor and the electric compressor and configured to receive and direct the first and second portions of the intake air to the engine. The engine system further includes an electronic control unit configured to control operation of at least the vane actuator and the electric compressor and an aftertreatment system arranged downstream of and fluidly coupled to the turbocharger to treat the exhaust gases.

In a further embodiment, the electronic control unit includes a turbocharger calibration module that, upon activation of the electric compressor, generates a command signal for the vane actuator to place the adjustable vanes into the open position.

In another embodiment, the automotive system further includes a manifold pressure and temperature sensor configured to generate first sensor signals representing a manifold pressure and temperature and an accelerator sensor configured to generate second sensor signals representing an accelerator position. The turbocharger calibration module is configured to generate the command signal for the vane actuator to place the adjustable vanes into the open position based on at least one of the first and second sensor signals.

In a further embodiment, the aftertreatment system has an aftertreatment device with a temperature activation threshold, and wherein the turbocharger calibration module generates the command signal for the vane actuator when the exhaust gas from the engine has a temperature less than the aftertreatment temperature activation threshold.

In another embodiment, the automotive system further includes a bypass valve fluidly coupled to the first compressor and the electric compressor and configured to selectively provide at least one of the first portion of intake air to the first compressor and the second portion of the intake air to the electric compressor.

In a further embodiment, the first compressor is upstream of the electric compressor such that the second portion of intake air is formed by the first portion of intake air.

In another embodiment, the electric compressor is upstream of the first compressor such that the first portion of intake air is formed by the second portion of intake air.

In a further embodiment, a method is provided for operating a turbocharger for an engine. The method includes determining, based on sensor signals, an engine manifold pressure and temperature and an instantaneous torque command; activating an electric compressor of the turbocharger based on the engine manifold pressure and temperature and the instantaneous torque command to provide a boost pressure to the engine; and actuating, upon activating the electric compressor, a variable geometry turbine into an open position.

In another embodiment, activating an electric compressor further includes activating the electric compressor when an exhaust gas temperature is lower than an aftertreatment activation threshold.

In a further embodiment, the method further includes actuating at least one valve of the turbocharger such intake air is compressed by the electric compressor and subsequently compressed by a further compressor mechanically coupled to the variable geometry turbine.

In another embodiment, the method further includes actuating at least one valve of the turbocharger such intake air is compressed by a further compressor mechanically coupled to the variable geometry turbine and subsequently compressed by the electric compressor.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
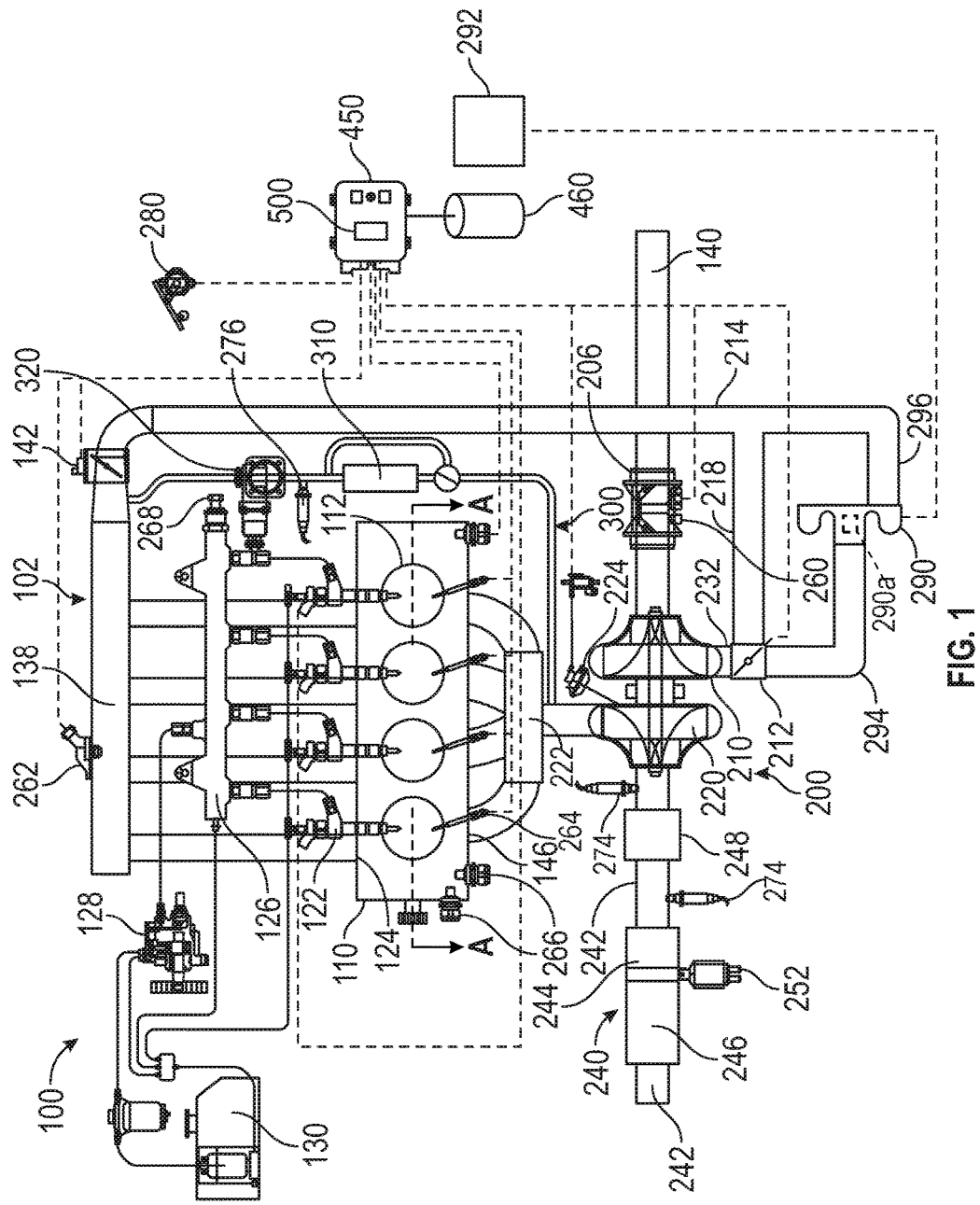
FIG. 1 is a schematic view of an automotive system according to an exemplary embodiment.
Figure 2:
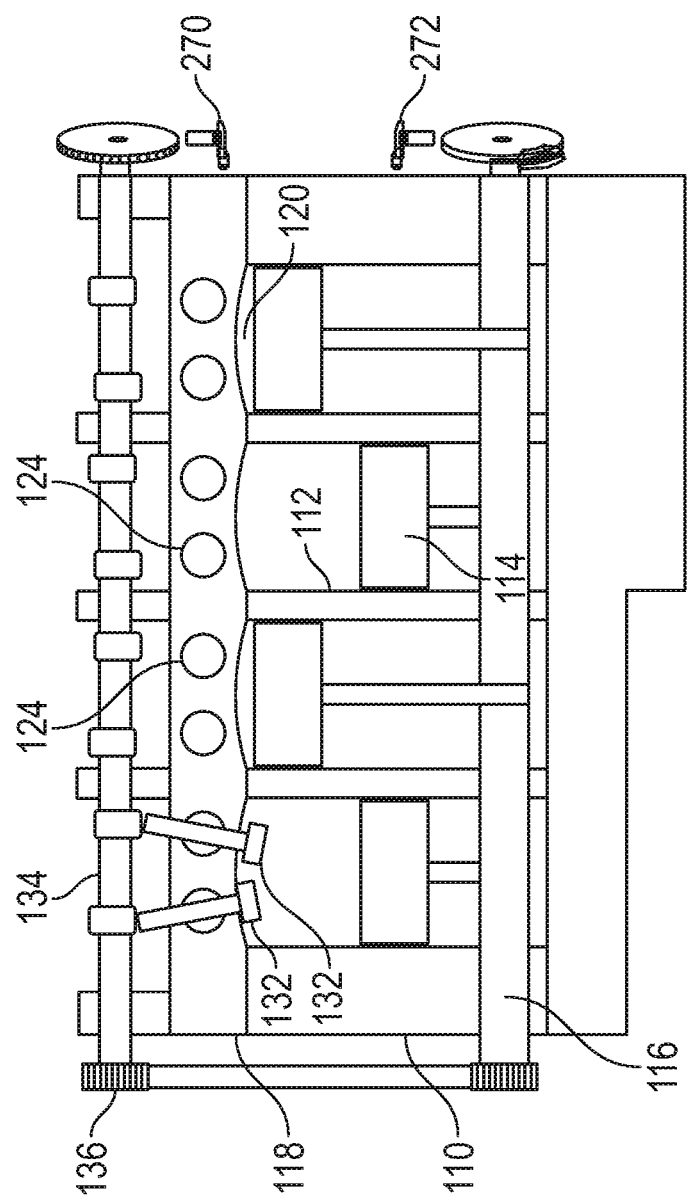
FIG. 2 is the section A-A of an internal combustion engine belonging to the automotive system of FIG. 1.

Some embodiments may include an automotive system 100, as shown in FIGS. 1 and 2 that includes an internal combustion engine 102. It is appreciated that the engine 102 and various aspects of the overall system 100 are merely exemplary in nature and that embodiments described herein may be implemented in various engine systems. As described in greater detail below, a turbocharger 200 may be provided to facilitate or improve performance, emissions, and/or efficiency of the internal combustion engine 102. As also described in greater detail below, various aspects of the automotive system 100 may be controlled based on signals from an electronic control unit (ECU) 450, which may include a turbocharger calibration module 500 that provides control signals for one or more components of the turbocharger 200.

In the depicted embodiment, the engine 102 includes an engine block 110 defining at least one cylinder 112 having a piston 114 coupled to rotate a crankshaft 116. A cylinder head 118 cooperates with the piston 114 to define a combustion chamber 120. A fuel and air mixture is directed in the combustion chamber 120 and ignited, thereby resulting in hot expanding exhaust gas forcing reciprocal movement of the piston 114. The air is provided through at least one intake port 124, and the fuel is provided via at least one fuel injector 122 from a fuel rail 126 in fluid communication with a high pressure fuel pump 128 and a fuel source 130. Each of the cylinders 112 has at least two valves 132 actuated by a camshaft 134 rotating in time with the crankshaft 116. The valves 132 selectively allow air into the combustion chamber 120 from the port 124. In some examples, a cam phaser 136 may selectively vary the timing between the camshaft 134 and the crankshaft 116.

The air may be distributed to the air intake ports 124 through an intake manifold 138. An air intake duct 140 may provide air from the ambient environment to the intake manifold 138 via the turbocharger 200 and manifold conduit 214, discussed below. A throttle body 142 may be provided to regulate the flow of air into the intake manifold 138. After combustion, the exhaust gas flows out of exhaust ports 146 through an exhaust manifold 222.

As introduced above, the turbocharger 200 may be provided to facilitate or improve performance, emissions, and/or efficiency. For example, the turbocharger 200 functions to force additional air into the automotive system 100, thereby increasing the pressure of the air flow entering the engine cylinders in order to enhance the engine torque. The difference between the air pressure resulting from operating the turbocharger 200 and the atmospheric pressure is usually referred to as the boost pressure.

The turbocharger 200 includes a turbine 220 coupled to the exhaust manifold 222 of the engine 102 to receive exhaust gas from the exhaust manifold 222. The turbine 220 is a variable geometry turbine (VGT) (also referred to as a variable nozzle turbines or VNT) with vanes that may be selectively adjusted by a VGT actuator 224 to alter the flow of the exhaust gas through the turbine 220. As examples, the vanes may rotate in unison to vary the gas swirl angle and the cross sectional area. As an alternative, the vanes may not rotate, but instead, the axial width of the inlet is selectively blocked by an axially sliding wall. In any event, the area between the tips of the vanes may be modified, thereby resulting in a variable aspect ratio.

The turbocharger 200 further includes a first compressor 210 rotationally coupled to the turbine 220. The turbine 220 provides mechanical energy to power the first compressor 210. Since the position of the vanes of the turbine 220 impacts the nature of the exhaust gas through the turbine 220, the position of the vanes also determine the mechanical output of the turbine 220 to the first compressor 210. The vane position ranges from a "completely open" position to a "completely closed" position.

In the completely closed position (e.g., narrowed to the minimum gap between vanes), the turbine 220 accelerates the exhaust gas towards the turbine blades, making the blades spin faster. This results in a greater amount of power being delivered to the first compressor 210 and the ability to deliver a greater amount of air to the engine 102 via the first compressor 210. As discussed in greater detail below, expansion of the exhaust gas from the vanes through the turbine 220 results in an enthalpy drop for the exhaust gas. In the completely open position (e.g., widened to the maximum gap between vanes), the exhaust gas is effectively unimpeded to the turbine blades, thereby resulting in a lower turbine speed and a lower amount of power being delivered to the first compressor 210. Moreover, the vanes may be positioned between the completely open and completely closed positions to provide an intermediate amount of airflow to the engine 102 with the first compressor 210.

In effect, the position of vanes dictates the amount of work extracted by the turbine 220 from the exhaust gas to be utilized by the first compressor 210. Upon exiting the turbine 220, the exhaust gas is directed into an aftertreatment system 240, described below.

As introduced above, the first compressor 210, driven by the turbine 220, receives air flow from the intake duct 140. The first compressor 210 increases the pressure and temperature of the air and subsequently directs the air through an outlet conduit 232. The first compressor 210 may be any suitable type of compressor, such as a volumetric compressor or aerodynamic compressor.

A valve 212 may be provided downstream of the first compressor 210 at the first compressor outlet conduit 232 and may be arranged in at least two positions based on commands from the ECU 450 and/or turbocharger calibration module 500. In a first position, the valve 212 directs the compressed air through a first (or bypass) conduit 218 to the manifold conduit 214, which directs the air into the manifold 138. In a second position, the valve 212 directs the air from the first compressor 210 to an electric (or second) compressor 290 via an electric compressor intake conduit 294. The electric compressor 290 is powered by an electrical energy source, such as a battery 292, and is controlled by signals from the ECU 450 and/or turbocharger calibration module 500. The electric compressor 290 converts the electrical energy into mechanical energy that further compresses the intake air. The electric compressor 290 may be any suitable type of compressor, such as a volumetric compressor or aerodynamic compressor that includes an electric motor 290a for driving its movable component.

An output conduit 296 from the electric compressor 290 directs the air into the manifold conduit 214 for introduction into the manifold 138. As such, the first compressor 210, powered by the turbine 220, and the electric compressor 290, powered by the battery 292, provide the additional air flow to the manifold 138.

Accordingly, the first compressor 210 may be considered to compress a first portion of the intake air, and the electric compressor 290 may be considered to compress a second portion of the intake air (or none of the intake air if valve 212 is in the first position). In this arrangement, the entire second portion (i.e. compressed by the electric compressor 1090) is formed by the first portion (i.e., compressed by the first compressor 1010). In this manner, the arrangement of FIG. 1 may be considered an "electric compressor-second serial arrangement." Additional details regarding the operation of the turbocharger 200 will be provided below.

Although not shown, an intercooler may be disposed in any one or more of the conduits or ducts 214, 218, 232, 294, 296 to reduce the temperature of the air prior to entering the intake manifold 138.

As introduced above, the aftertreatment system 240 receives the exhaust gas and may include an exhaust pipe 242 having one or more exhaust aftertreatment devices configured to change the composition of the exhaust gas. Some examples of aftertreatment devices of the aftertreatment system 240 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF). In the depicted example, the aftertreatment devices of the aftertreatment system 240 may include a diesel oxidation catalyst (DOC) 244 for degrading residual hydrocarbons (HC) and carbon oxides (CO) contained in the exhaust gas and a diesel particulate filter (DPF) 246 for capturing and removing diesel particulate matter from the exhaust gas. The aftertreatment devices of the aftertreatment system 240 may further include selective catalytic reduction (SCR) system components, such as a SCR catalyst 248 disposed in the exhaust pipe downstream of the DPF 246, and a diesel-exhaust-fluid (DEF) injector 252 arranged to inject DEF into the exhaust pipe 242, which mixes with the exhaust gas for conversion into a gaseous reducing agent.

In some embodiments, one or more components of the aftertreatment system 240 may be designed to operate in particular temperature ranges. For example, the SCR catalyst 248 and/or DPF 246 may most effectively degrade hydrocarbons (HC) and carbon oxides (CO) at exhaust gas temperatures higher than an associated aftertreatment activation threshold. As described in greater detail below, the turbocharger 200 may be operated to more quickly achieve exhaust gas temperatures that exceed the aftertreatment activation threshold after starting and/or to maintain exhaust gas temperatures above the activation threshold during operation.

One or more exhaust gas recirculation (EGR) systems 300 may be provided to reduce nitrogen oxide (NOx) emissions in the automotive system 100 by recirculating exhaust gas back into the engine 102. Generally, the EGR system 300 may include a "long-route" (LR) (or low pressure) EGR system (not shown) and/or a "short-route" (SR) EGR system 300. The depicted embodiment includes a SR-EGR system 300 as an example. As shown, the EGR system 300 may include an EGR cooler 310 to reduce the temperature of the exhaust gases in the EGR system 300, as well as a bypass conduit to bypass the EGR cooler 310. An EGR valve 320 regulates a flow of exhaust gases in the EGR system 300.

As introduced above, the automotive system 100 includes an electronic control unit (ECU) 450 in communication with one or more sensors and/or devices associated with the engine 102 and other automotive system components. In FIG. 1, dashed lines are used to indicate communication between the ECU 450 and the various sensors and devices, but some are omitted for clarity. Generally, the ECU 450 may receive input signals from sensors configured to generate the signals in proportion to various physical parameters associated with the engine 102. The sensors include, but are not limited to, a mass airflow and temperature sensor 260, a manifold pressure and temperature sensor 262, a combustion pressure sensor 264, coolant and oil temperature and level sensors 266, a fuel rail pressure sensor 268, a cam position sensor 270, a crank position sensor 272, exhaust pressure sensors 274, an EGR temperature sensor 276, and an accelerator pedal position sensor 280. Furthermore, the ECU 450 may generate output signals to various control devices that are arranged to control the operation of the engine 102, including, but not limited to, the fuel injectors 122, the throttle body 142, the intake valve 206, and the cam phaser 136.

The ECU 450 particularly controls operation of the turbocharger 200 based on various sensed and/or modeled parameters such as, for example, engine speed, coolant temperature, turbine position, manifold pressure and temperature, acceleration position, and boost pressure. Based on the parameters, the ECU 450 regulates operation of the turbocharger 200 by generating command signals to the various components. In one embodiment, a turbocharger calibration module 500 may be implemented by the ECU 450 to control operation of the turbocharger 200 by generating command signals for the electric compressor 290 and other components of the turbocharger 200, such as the valve 212 and/or VGT actuator 224, as will be described in greater detail below.

Generally, the ECU 450 may include a digital processing unit in communication with a memory system, such as data source 460, and an interface bus. The processing unit is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the processing unit to carry out the steps of such methods and control the automotive system 100.

The program stored in the memory system may be transmitted from outside via a cable or in a wireless fashion. In some instances, the program may be embodied as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature. An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop. In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like. The ECU 450 may be embodied in any suitable form to provide the electronic logic, e.g. an embedded controller, an onboard computer, or any processing module that might be deployed in the vehicle.

Figure 3:
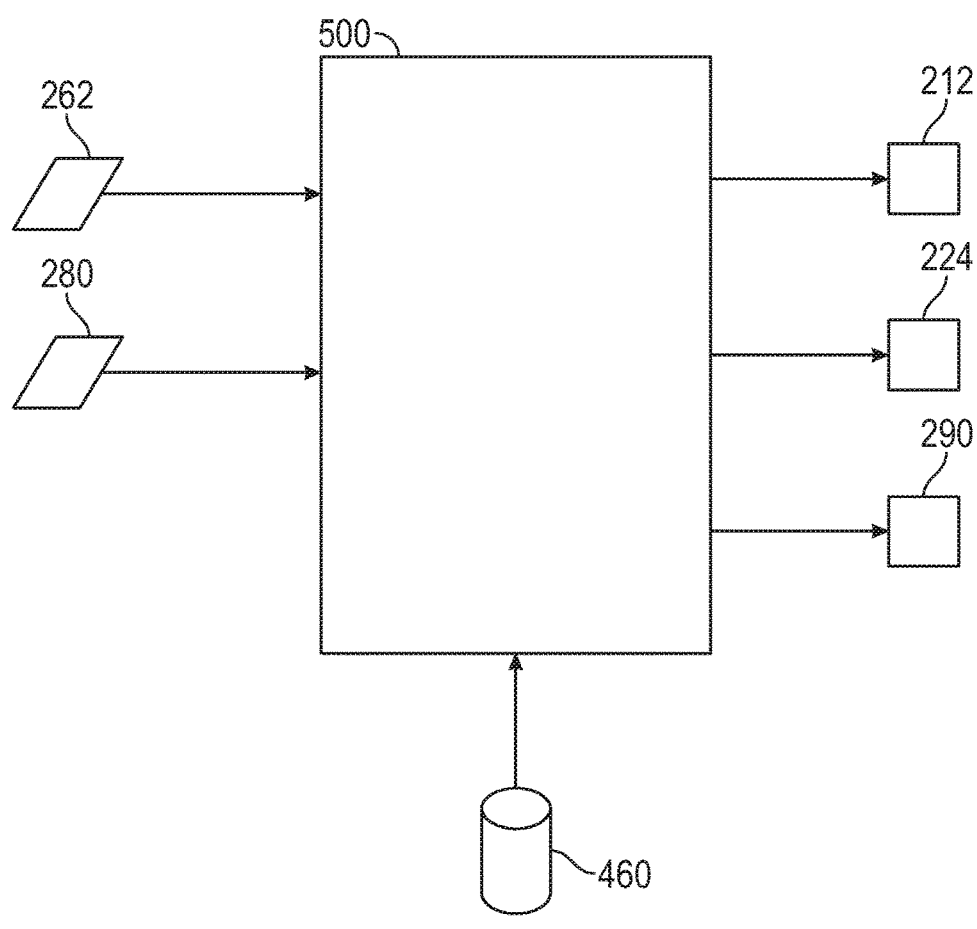
FIG. 3 is schematic block diagram of a turbocharger calibration module of an electronic control unit of the automotive system of FIG. 1 according to an exemplary embodiment.

As introduced above, a turbocharger calibration module 500 may be implemented by the ECU 450 to control operation of one or more components of the turbocharger 200. FIG. 3 is a functional block diagram of the turbocharger calibration module 500 with dataflow that illustrate various operational aspects of the turbocharger 200. The turbocharger calibration module 500 may be considered to implement one or more functional sub-units or additional modules. FIG. 3 will be described below with additional reference to FIG. 1.

Generally, the turbocharger calibration module 500 may receive any type of input. In particular, the turbocharger calibration module 500 includes a TMAP (temperature-manifold absolute pressure) signal from the manifold pressure and temperature sensor 262 and/or an instantaneous torque command signal, e.g., such as may be derived based on signals from the acceleration pedal position sensor 280.

The turbocharger calibration module 500 evaluates the TMAP signal and/or the instantaneous torque command in view of operational profiles stored in data source 460. Generally, the TMAP signal and/or the instantaneous torque command enables the turbocharger calibration module 500 to determine a boost pressure requested value and the associated component commands to achieve the boost pressure requested value. In response, the turbocharger calibration module 500 may output one or more command signals. In the depicted embodiment, the turbocharger calibration module 500 generates a valve command signal for actuating valve 212, a VGT actuation signal for actuating VGT actuator 224 of the turbine 220, and/or an electric compressor signal for actuating the electric compressor 290.

In one exemplary embodiment, the turbocharger calibration module 500 operates the turbine 220 in conjunction with the electric compressor 290. In particular, when the turbocharger calibration module 500 activates the electric compressor 290, the turbocharger calibration module 500 completely opens the vanes of the turbine 220. In one embodiment, operation of the electric compressor 290 in combination with the complete opening of the vanes of the turbine 220 may be referred to herein as a "combination strategy."

As noted above, maintaining the turbine 220 in the completely open position enables the exhaust gas to avoid or mitigate enthalpy drop that would otherwise occur as the exhaust gas expands from the vanes through the turbine 220. As a result, cooling of the exhaust gas through the turbine 220 is mitigated and/or avoided, thereby enabling a quicker achievement and/or maintenance of elevated exhaust gas temperatures. As noted above, operation of the aftertreatment system 140 is enhanced at exhaust gas temperatures higher than the aftertreatment activation threshold. Accordingly, operation according to the combination strategy may improve emission performance, while maintaining the ability to provide sufficient boost pressure, as discussed in greater detail below.

Figure 4:
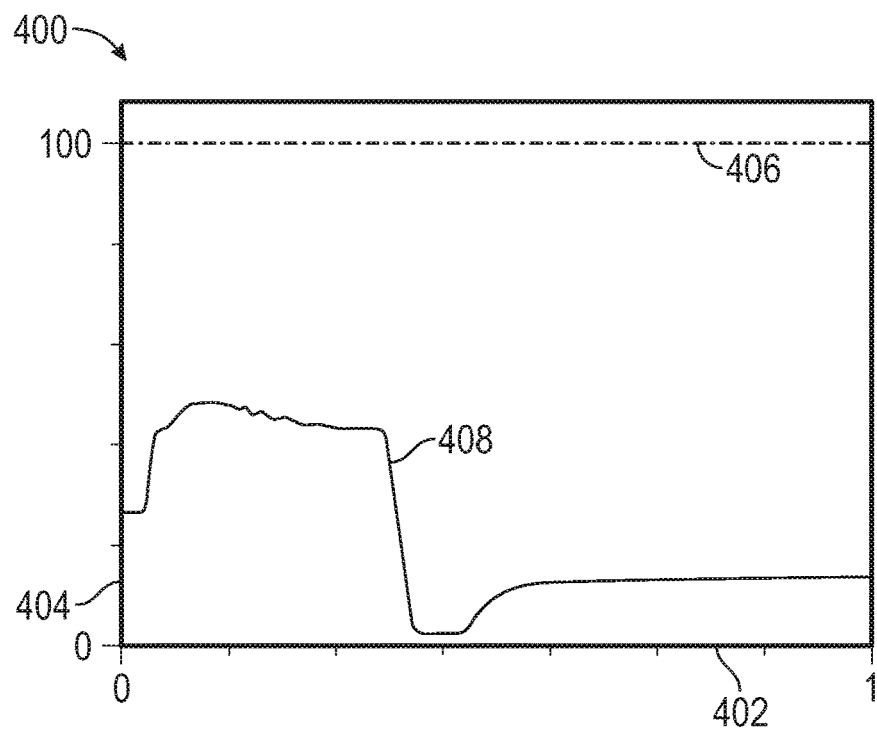
FIGS. 4 and 5 are operational and performance charts associated with the automotive system of FIG. 1 according to exemplary embodiments.

An example of the combination strategy for operating the turbocharger 200 is provided by a chart 400 of FIG. 4. In FIG. 4, time (normalized from 0 to 1) is depicted on the horizontal axis 402 and turbine vane position (from "0" as completely closed to "100" as completely open) is depicted on the vertical axis 404. In this example, the turbine vane position is provided from the initiation of operation.

In the scenario of FIG. 4, the turbocharger calibration module 500 activates the electric compressor 290. Thus, as indicated by line 406 of FIG. 4, the vanes of the turbine 220 are completely open during operation of the electric compressor 290. This is in contrast to typical operation of a turbocharger turbine, which is indicated by line 408. As indicated by line 408, during typical operation of the turbocharger turbine (e.g., without benefit of the electric compressor 290), the turbine must continuously respond to the load request, including closing of the vanes of the turbine in order to guarantee sufficient boost supply, e.g., to increase output to the compressor driven by the turbine. However, the partially closed vanes of the VGT may result in high expansion rates into the turbine, and therefore, enhanced cooling of the exhaust gas.

Conversely, when the vanes of the turbine 220 are maintained in the open position, as indicated by line 406, and the electric compressor 290 provides the requested boost supply instead of relying solely on the first compressor 210, the exhaust gas maintains a higher temperature through the turbine 220. This result is demonstrated by the chart 550 of FIG. 5.

Figure 5:
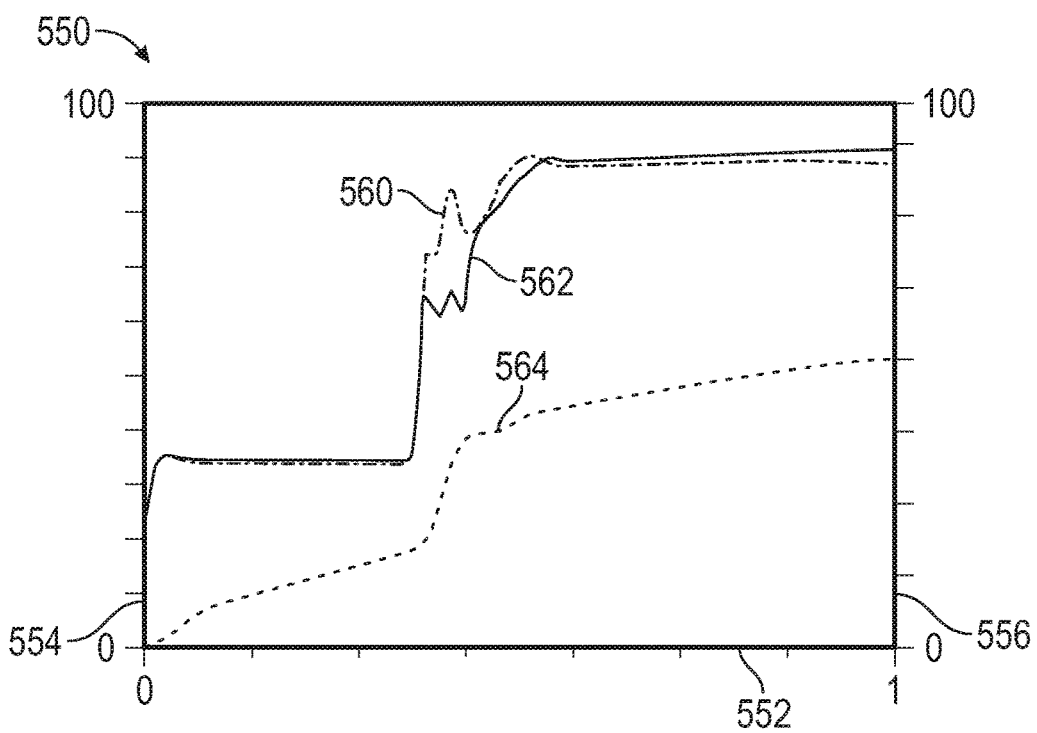

The chart 550 of FIG. 5 includes time (normalized from 0 to 1) on the horizontal axis 552, normalized temperature after the turbocharger on the left vertical axis 554, and normalized thermal power gain on the right vertical axis 556. The chart 550 of FIG. 5 additional depicts line 560 representing the temperature as a function of time of the turbocharger 200 operating according to the combination strategy. In other words, line 560 represents operation of the electric compressor 290 in combination with the turbine vanes in a completely open position (e.g., corresponding to line 406 of FIG. 4). For comparison, line 562 depicts a more typical operation of the turbocharger turbine without an electric compressor in which the turbine must provide power for sufficient boost (e.g., corresponding to line 406 of FIG. 4).

As demonstrated by comparing the lines 560, 562, the combination strategy results in a higher temperature. The difference in the respective temperatures is represented by line 564, which represents the overall thermal power gain over time. As noted above, the thermal power gain is a result of the avoidance of enthalpy drop of the exhaust gases through the turbine. In other words, conventional operation with at least partially closed turbine vanes causes an undesirable enthalpy drop that may be avoided with a combination strategy according to exemplary embodiments.

As demonstrated by FIG. 5, the boost pressure before starting the combination strategy and at the end of the combination strategy may be generally equivalent to the target boost pressures of a calibration without using the electric compressor 290. In the intermediate period, conditions may be different because of a faster boost rise. However, as also shown in FIG. 5, the combination strategy results in higher exhaust temperatures. The increased temperatures in the exhaust systems may be a result of a combination of the above-described turbine management (e.g., the open position) and higher instantaneous fuel injection possible due to higher boost available when electric compressor 290 is active.

Figure 6:
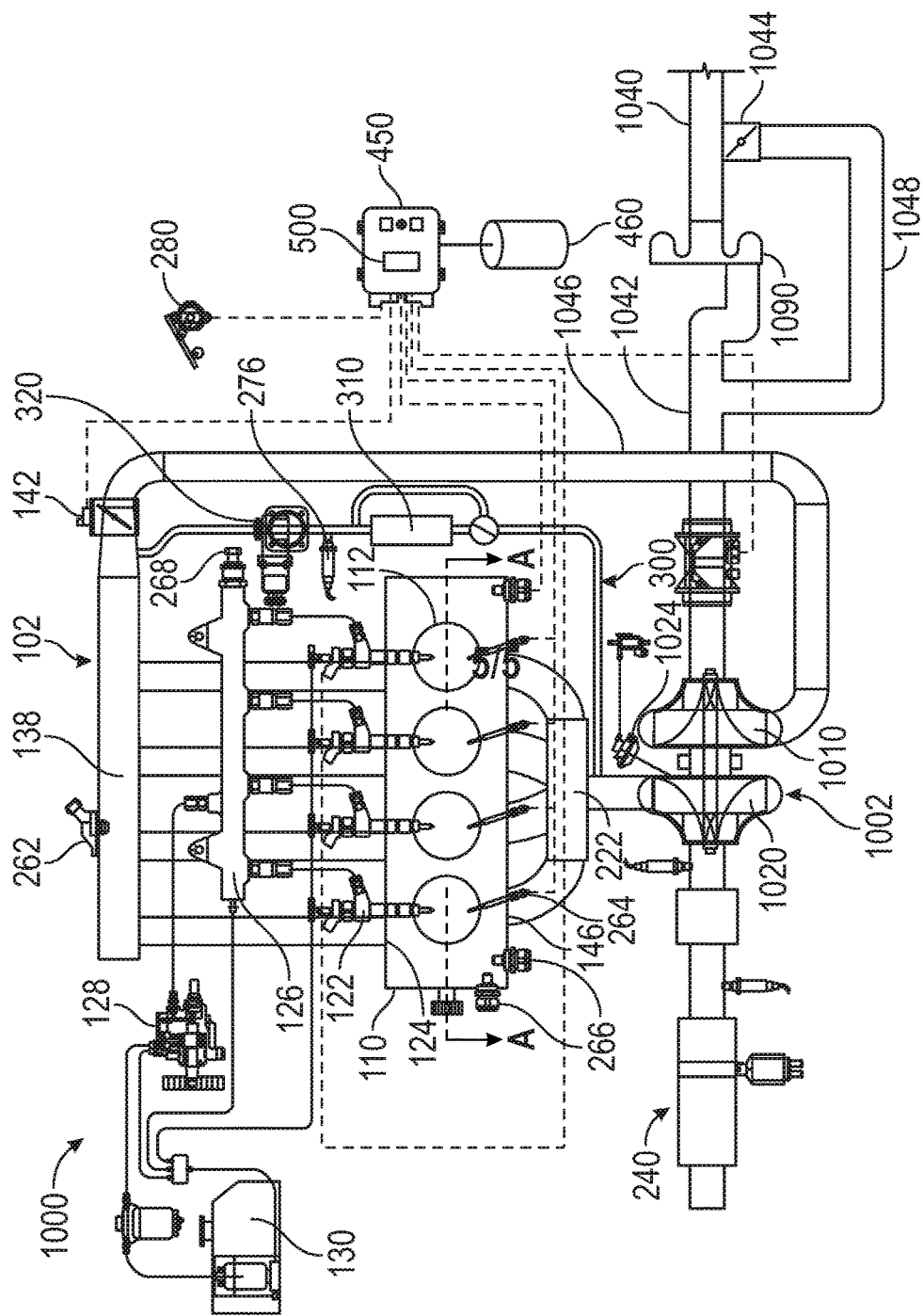
FIG. 6 is a schematic view of an automotive system according to another exemplary embodiment.

FIG. 6 is a schematic view of an automotive system 1000 according to an alternative exemplary embodiment. Unless otherwise noted, the automotive system 1000 corresponds to the automotive system 100 described with reference to FIGS. 1 and 2. As such, a number of elements in FIG. 6 have like reference numerals that correspond to similar elements in FIG. 1 and will not be described again in detail. Generally, the elements of the automotive system 1000 of FIG. 6 are similar to the automotive system 100 of FIG. 1 with the exception of the turbocharger arrangements, as will be described in greater detail below.

Referring to FIG. 6, the automotive system 1000 includes an internal combustion engine 102 and aftertreatment system 240 operated according to signals from an ECU 450. The automotive system 1000 further includes a turbocharger 1002 that operates according to signals of the turbocharger calibration module 500 incorporated into the ECU 450.

In this embodiment, the turbocharger 1002 includes a first compressor 1010 and turbine 1020 that generally correspond to the first compressor 210 and turbine 220 of FIG. 1. As above, the turbine 1020 is a VGT with vanes that may be selectively adjusted by a VGT actuator 1024. The turbocharger 1002 further includes an electric compressor 1090 with an inlet that receives air from the intake duct 1040. The outlet of the electric compressor 1090 is fluidly coupled to an intake conduit 1042 of the first compressor 1010.

A valve 1044 is arranged on the intake duct 1040. The valve 1044 has two or more positions controlled according to signals from the ECU 450 and/or turbocharger calibration module 500.

When the valve 1044 is in a first position, intake air is directed through the electric compressor 1090, through the intake conduit 1042, through the first compressor 1010, and into the manifold intake conduit 1046. As a result, in this position, the compressors 1090, 1010 are in a serial arrangement to compress the intake twice. When the valve 1044 is in a second position, intake air bypasses the electric compressor 1090 through a bypass conduit 1048 and into the intake conduit 1042, through the first compressor 1010, and into the manifold intake conduit 1046. As a result, in this position, the air is compressed only by the first compressor 1010. In this manner, the arrangement of FIG. 6 may be considered an "electric compressor-first serial arrangement."

Although not depicted, operation of the systems 100, 1000 described above may be implemented as a method, e.g., by an ECU. In such a method, the ECU may operate the turbocharger based on a number of parameters, such as speed, coolant temperature, turbine position, manifold pressure and temperature, accelerator position, and boost pressure. When the ECU determines that the exhaust temperature should be increased (e.g., because the temperatures are below an aftertreatment activation temperature), the ECU initiates operation of the electric compressor, actuates one or valves to direct intake air to the electric compressor, and opens the VGT. The ECU may monitor exhaust temperatures and other operating parameters until conditions are such that the electric compressor may be turned off and the VGT may resume or initiate variable operation.

In some embodiments, the behavior of VGT vanes of the turbocharger 200 may be replicated by a wastegate port of a turbocharger. In other words, to increase exhaust gas temperatures, the wastegate ports may be opened and the electric compressor may operate to provide the requested boost pressure, and when the exhaust gas temperatures are sufficient, the wastegate ports may be closed.

Accordingly, exemplary embodiments may provide for operation of an automotive system with a turbocharger and an aftertreatment system. In particular, exemplary embodiments provide a calibration strategy in which an electric compressor supplies the required charge to the engine while the variable geometry turbine is in a completely open vane position. This calibration strategy modifies the typical expansion rate through the turbine vanes and provides additional available boost pressure. In effect, if the compression work is provided by the electric compressor, then the turbine can provide lower kinetic energy by rotating slower. As a result, the lower flow expansion rate through the turbine may lead to higher thermal power to the aftertreatment system, thereby making the light-off phase shorter and thus the aftertreatment system more efficient without modification to combustion parameters, particularly during load step maneuvers for mid to high loads.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Example embodiments are provided so that this disclosure will be thorough, and will convey the scope to those who are skilled in the art. Details may be set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbocharger system for an engine of a vehicle, comprising:
    a variable geometry turbine configured to receive exhaust gas from the engine, the variable geometry turbine including adjustable vanes and a vane actuator configured to adjust the adjustable vanes between at least an open position and a closed position;
    an intake duct configured to receive intake air;
    a first compressor rotationally coupled to the variable geometry turbine and fluidly coupled to the intake duct to compress at least a first portion of the intake air;
    an electric compressor fluidly coupled to the intake duct and configured to compress at least a second portion of the intake air;
    a manifold conduit fluidly coupled to the first compressor and the electric compressor and configured to receive and direct the first and second portions of the intake air to a manifold of the engine;
    an aftertreatment system including an aftertreatment activation temperature threshold; and
    an electronic control unit in communication with the vane actuator and the electric compressor;
    wherein the electronic control unit is configured to control operation of at least the vane actuator and the electric compressor;
    wherein the electronic control unit further includes a turbocharger calibration module having a processor that, upon activation of the electric compressor, is configured to generate a command signal for the vane actuator to place the adjustable vanes into the open position; and
    wherein the processor of the turbocharger calibration module is configured to generate the command signal for the vane actuator when a temperature of exhaust gas discharged from the engine is less than the aftertreatment activation temperature threshold.

2. The turbocharger system of claim 1, wherein the processor of the turbocharger calibration module is configured to generate the command signal for the vane actuator based on sensor signals representing engine manifold pressure and temperature.

3. The turbocharger system of claim 2, wherein the processor of the turbocharger calibration module is further configured to generate the command signal for the vane actuator based on an instantaneous torque command signal.

4. The turbocharger system of claim 1, further comprising a bypass valve fluidly coupled to the first compressor and the electric compressor, and configured to provide at least one of the first portion of intake air to the first compressor and the second portion of the intake air to the electric compressor based on a command signal from the processor of the turbocharger calibration module.

5. The turbocharger system of claim 1, wherein the first compressor is upstream of the electric compressor such that the second portion of intake air comprises the first portion of intake air.

6. The turbocharger system of claim 1, wherein the electric compressor is upstream of the first compressor such that the first portion of intake air is formed by the second portion of intake air.

7. An automotive system, comprising:
    an internal combustion engine configured to combust intake air and to produce exhaust gas;
    a turbocharger coupled to receive the intake air from an intake duct and direct the intake air to the internal combustion engine, the turbocharger comprising:
        a variable geometry turbine fluidly coupled to receive the exhaust gas from the engine, the variable geometry turbine including adjustable vanes and a vane actuator configured to adjust the adjustable vanes between at least an open position and a closed position;
        a first compressor rotationally coupled to the variable geometry turbine and fluidly coupled to the intake duct to compress at least a first portion of the intake air;
        an electric compressor fluidly coupled to the intake duct and configured to compress at least a second portion of the intake air; and
        a manifold conduit fluidly coupled to the first compressor and the electric compressor and configured to receive and direct the first and second portions of the intake air to the engine;
    an aftertreatment system arranged downstream of and fluidly coupled to the turbocharger to treat the exhaust gas, wherein the aftertreatment system has an aftertreatment device including an aftertreatment activation temperature threshold; and an electronic control unit configured to control operation of at least the vane actuator and the electric compressor;

wherein the electronic control unit is in communication with the vane actuator and the electric compressor;

wherein the electronic control unit further includes a turbocharger calibration module having a processor that, upon activation of the electric compressor, is configured to generate a command signal for the vane actuator to place the adjustable vanes into the open position; and wherein the processor of the turbocharger calibration module is configured to generate the command signal for the vane actuator when a temperature of the exhaust gas discharged from the engine is less than the aftertreatment activation temperature threshold.

8. The automotive system of claim 7, further comprising a manifold pressure and temperature sensor configured to generate first sensor signals representing a manifold pressure and temperature and an accelerator sensor configured to generate second sensor signals representing an accelerator position, wherein the processor of the turbocharger calibration module is configured to generate the command signal for the vane actuator to place the adjustable vanes into the open position based on at least one of the first and second sensor signals.

9. The automotive system of claim 7, further comprising a bypass valve fluidly coupled to the first compressor and the electric compressor and configured to provide at least one of the first portion of intake air to the first compressor and the second portion of the intake air to the electric compressor based on a command signal from the processor of the turbocharger calibration module.

10. The automotive system of claim 7, wherein the first compressor is upstream of the electric compressor such that the second portion of intake air is formed by the first portion of intake air.

11. The automotive system of claim 7, wherein the electric compressor is upstream of the first compressor such that the first portion of intake air is formed by the second portion of intake air.

12. A method of operating a turbocharger for an engine having a turbocharger calibration module implemented by an electric control unit and including a processor, and an aftertreatment device having an aftertreatment activation temperature threshold and being arranged downstream of the turbocharger, comprising:

determining, by the processor of the turbocharger calibration module, based on sensor signals, an engine manifold pressure and temperature and an instantaneous torque command;

activating, by the processor of the turbocharger calibration module, an electric compressor of the turbocharger based on the engine manifold pressure and temperature and the instantaneous torque command to provide a boost pressure to the engine; and actuating, by the processor of the turbocharger calibration module, upon activating the electric compressor, a variable geometry turbine into an open position;

wherein the activating the electric compressor further comprises activating, by the processor of the turbocharger calibration module, the electric compressor when a temperature of exhaust gas discharged from the engine is less than the aftertreatment activation temperature threshold.

13. The method of claim 12, further comprising actuating, by the processor of the turbocharger calibration module, at least one valve of the turbocharger such that intake air is compressed by the electric compressor and subsequently compressed by a further compressor mechanically coupled to the variable geometry turbine.

14. The method of claim 12, further comprising actuating, by the processor of the turbocharger calibration module, at least one valve of the turbocharger such that intake air is compressed by a further compressor mechanically coupled to the variable geometry turbine and subsequently compressed by the electric compressor.

* * * * *